I. C. SCUDDER.
VEHICLE WHEEL.
APPLICATION FILED FEB. 16, 1907.

899,333.

Patented Sept. 22, 1908.
2 SHEETS—SHEET 1.

WITNESSES

INVENTOR
Isaiah C. Scudder
BY
ATTORNEYS

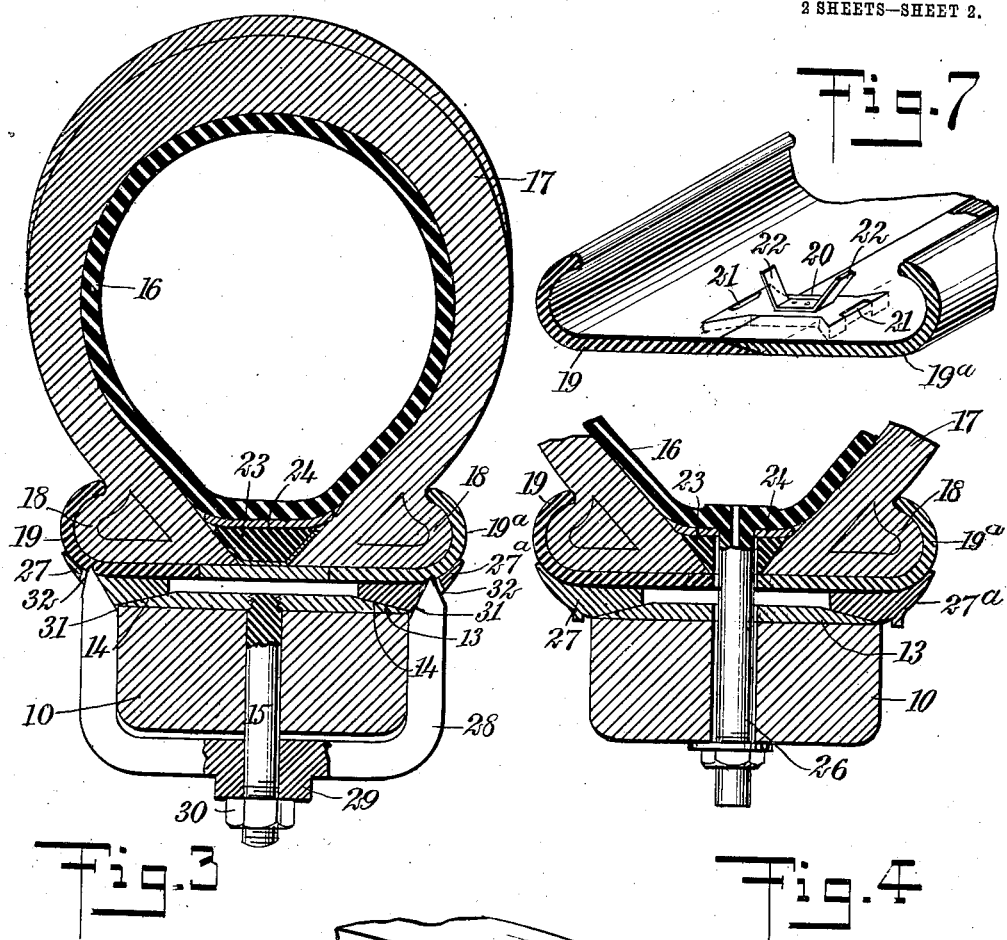

UNITED STATES PATENT OFFICE.

ISAIAH C. SCUDDER, OF NEW YORK, N. Y.

VEHICLE-WHEEL.

No. 899,333.

Specification of Letters Patent.

Patented Sept. 22, 1908.

Application filed February 16, 1907. Serial No. 357,637.

*To all whom it may concern:*

Be it known that I, ISAIAH C. SCUDDER, a citizen of the United States, and a resident of the city of New York, borough of Manhattan, in the county and State of New York, have invented a new and Improved Vehicle-Wheel, of which the following is a full, clear, and exact description.

This invention relates to certain improvements in vehicle wheels, and more particularly to means for securing the tire thereto, whereby the latter may be readily attached or detached while inflated.

The object of the invention is to provide a detachable rim adapted to support and carry an inflated tire, and to provide means whereby this rim may be quickly and easily attached in its place without the necessity for the employment of any specially-constructed tools.

The invention consists in certain features of construction and combination of parts, all of which will be fully set forth hereinafter and particularly pointed out in the claims.

Figure 1:
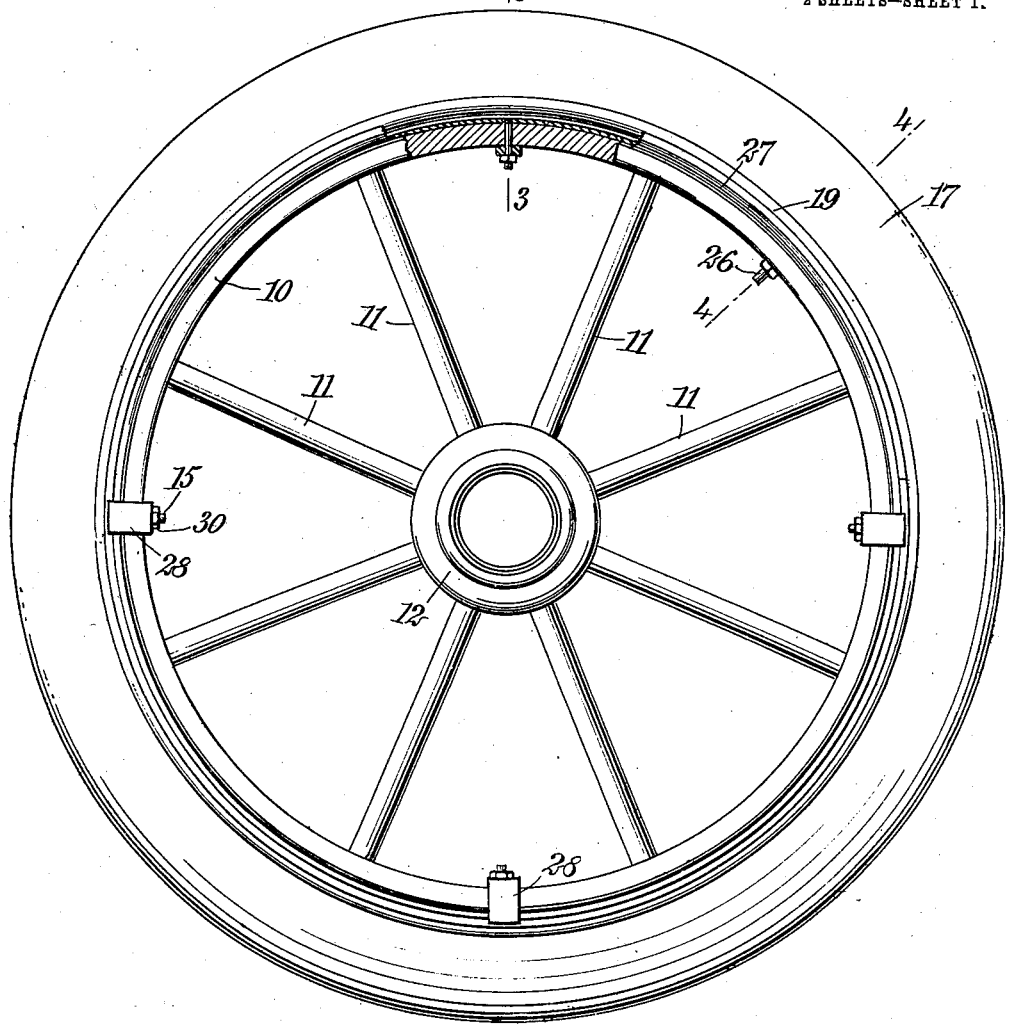
Figure 2:
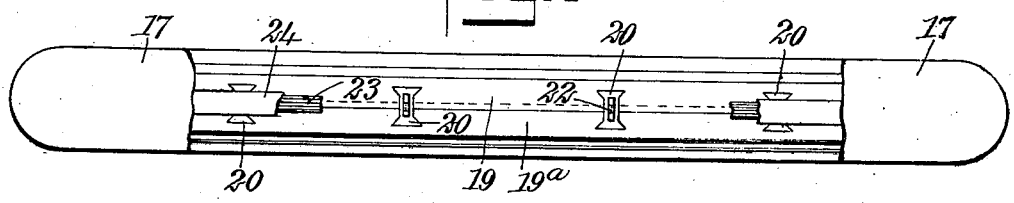

Reference is to be had to the accompanying drawings forming a part of this specification, in which similar characters of reference indicate corresponding parts in all the figures, in which Figure 1 is a side elevation of a vehicle wheel provided with my improved tire securing means, a portion of said wheel being broken away; Fig. 2 is a plan view of said wheel, a portion of the tire being broken away; Fig. 3 is a transverse section, said section being taken on the line 3—3 of Fig. 1; Fig. 4 is a partial transverse section through the valve stem, said section being taken on the line 4—4 of Fig. 1; Fig. 5 is a detail perspective view of the inner locking ring adjacent the opening for the valve stem; Fig. 6 is a perspective view of a portion of one of the locking rings; and Fig. 7 is a perspective view of a portion of the two clamping rings, showing the means for securing the same together.

My improved device is adapted for use in connection with any form of vehicle wheel having a felly 10 supported by spokes 11 of any suitable character and connected to a suitable hub 12. The outer surface of the felly 10 is preferably smooth and provided with a metallic band 13 of a width substantially equal to the width of the felly and having the portions thereof adjacent the outer edges tapered so as to present inclined faces 14. This metallic band is secured in place in any suitable manner and carries locking bolts 15 extending inward through the felly at intervals, as illustrated in Figs. 1 and 3.

In connection with the wheel having the felly and metallic band above described, I employ a pneumatic tire of the ordinary form of construction and having an inner tube 16 and an outer shoe 17. The latter is provided with outwardly extending base flanges 18, which on the ordinary vehicle wheel are held within grooves in the felly or rim. In my improved construction, I provide two clamping rings 19, 19ª having means for securing the same together, and each having its outer edge curved upward and inward to inclose the base flanges of the shoe. The flat main portion of each clamping ring is adapted to extend across the surface of the base flanges of the shoe and meet along the center line. The meeting edges are preferably beveled so as to overlap as indicated in Fig. 7, and at intervals along the length of these clamping rings means are provided for rigidly securing the same together. These means as indicated in Figs. 2 and 7, comprise locking keys 20, each of which is of substantially the same thickness as the clamping rings 19 and 19ª, and is adapted to fit within an opening in each of said rings. These keys are each preferably provided with a rectangular center portion and enlarged or dove-tailed end portions, whereby when the key is inserted within oppositely-disposed openings in the meeting edges of the clamping rings, the latter are positively prevented from spreading apart or moving in relation to each other, except in a radial direction in respect to the wheel. Each of the keys 20 is preferably cut away to form recesses 21 adjacent each end, whereby a pointed tool may be readily inserted to draw the key out of its place when the rim is detached from the wheel. Each key is also preferably provided with inwardly-extending divergent flanges 22 which may be constructed as illustrated in Fig. 7. These flanges are preferably formed of a piece of thin spring steel having its center or intermediate portion riveted or soldered to the intermediate portion of the locking key.

In connection with the parts above described, I employ an inner locking ring 23, preferably rhomboidal in cross section, and its opposite beveled sides adapted to contact with the inner surfaces of the shoe adjacent the base flanges. The inner or widest surface of the locking ring is provided with a cover or lining 24 of leather or other suitable material, which latter contacts with the surface of the inner tube 16. The outer or narrowest side of the locking ring preferably lies between the base flanges of the shoe and contacts with the keys 20 and the meeting edges of the clamping rings 19, 19ᵃ. This locking ring is preferably formed of steel, although it is evident that any other suitable material may be employed.

In assembling the tire and detachable rim the inner tube is placed within the shoe and the locking ring 23 inserted between the base flanges 18. This locking ring 23 is provided with a radial opening 25 for the passage of the valve stem 26, as is also the leather lining strip 24. The locking ring is preferably severed adjacent this opening, whereby the ring may be more readily inserted in place, and the lining 24 overlaps the joint in the ring and is itself cut at a point adjacent thereto, as clearly indicated in Fig. 5. Having placed the locking ring 23 between the base flanges of the shoe, the two clamping rings 19, 19ᵃ are placed in position with their outer curved portions inclosing the outer surfaces of the base flanges and their inner meeting edges lying in the same plane. The divergent flanges 22 of the locking keys are then forced toward each other until they lie substantially parallel and the ends are then inserted between the base flanges of the shoe and the locking ring 23, as indicated in Fig. 3. The outward spring movement of these flanges causes them to travel inward and to draw the locking key into position. The tire is then inflated and all of the parts become rigidly locked in position. The harder the tire is inflated, the greater will be the outward pressure upon the ring 23 and the tighter will be the clamping action against the flanges 22, whereby the locking keys 20 are prevented from accidental or intentional removal.

To permit the above assembling of the detachable rim and the remainder of the wheel, I construct the clamping rings 19, 19ᵃ with an inner diameter slightly greater than the outer diameter of the metallic band 13, whereby a thin annular space, preferably about one-eighth of an inch in width, is left when the tire and rim is placed about the metallic band 13. This permits the portion of the tire and rim carrying the valve stem 26 to be placed adjacent the felly and metallic band, while the main portion of the detachable rim lies at an angle to the plane of the wheel and whereby the valve stem may be passed through the opening provided therefor in the felly as the opposite side of the tire and rim is moved into engagement with its corresponding portion of the felly and metallic band.

For securing the detachable rim to the wheel, I preferably provide two locking rings 27, 27ᵃ having inner wedge-shaped edges adapted for insertion between the metallic band 13 and the clamping rings of the detachable rim. These locking rings are severed diagonally as indicated in Fig. 6, whereby the ends may be spread a slight distance apart to vary the diameter of the rings, and each ring is adapted to engage with the corresponding beveled face 14 of the metallic band. Upon placing the tire and detachable rim in position as above described and inserting the wedge-shaped locking rings in the annular space intermediate the two, the rim and tire may be rigidly secured in place. For forcing the locking rings into position and firmly holding them in place, I preferably provide a plurality of U-shaped clamps 28 readily movable in respect to the wheel and inclosing the felly to engage with the locking rings 27—27ᵃ at oppositely disposed points. Each clamp is preferably provided with a central hub portion 29 having a passage therethrough for one of the draw bolts 15, whereby upon tightening the nut 30, the clamp may be forced outward radially. The outer ends of the clamp are provided with beveled surfaces 31 which engage with corresponding beveled surfaces within recesses 32 of the clamping rings, whereby radial movement of the clamps force the locking rings toward each other, and this inner movement of the latter causes them to become rigidly wedged between the metallic band 13 and the clamping rings to firmly secure the tire and its detachable rim in place.

Having thus described my invention, I claim as new and desire to secure by Letters Patent:

1. In combination, a vehicle wheel having an outer metallic band, a detachable rim, oppositely-disposed locking rings adapted for locking said rim to said metallic band, and means for simultaneously forcing said locking rings into place, said means including a plurality of radially movable U-shaped clamps.

2. In combination, a vehicle wheel having an outer metallic band, a detachable rim, oppositely-disposed locking rings having beveled surfaces and adapted for locking said rim to said metallic band, and means for simultaneously forcing said locking rings into place, said means including a plurality of radially movable U-shaped clamps, the ends of said clamps being beveled and adapted for engagement with said beveled surfaces of said locking rings.

3. In combination with a shoe having outwardly-extending base flanges, of a detachable rim comprising oppositely-disposed clamping rings having portions adapted for engagement with said base flanges, locking keys for holding said clamping rings together, a locking ring adapted for insertion between the base flanges of the shoe, and means carried by the locking keys for engagement between said locking ring and said base flanges for holding said keys in position.

4. In combination with a tire having base flanges, a detachable rim having portions adapted for engagement with said base flanges, locking keys for engagement with said detachable rim, a locking ring between said base flanges, and outwardly extending spring clips carried by said locking keys and adapted to be held in place by said locking ring when said tire is inflated.

5. In combination, a vehicle wheel, having an outer metallic band, said band presenting two outwardly and laterally inclined surfaces, a detachable rim, oppositely disposed locking rings having beveled inner edges adapted for insertion between said rim and the respective inclined surfaces of the band for locking the rim to said band, and radially movable means for forcing said locking rings into position.

6. In combination, a vehicle wheel having a felly, a detachable rim surrounding said felly but spaced therefrom, the distance between said rim and said felly being greater adjacent the edges than adjacent the center thereof, oppositely disposed locking rings having beveled inner edges adapted for lateral insertion between said felly and said rim, and radially movable means for forcing said rings into locking position.

7. A vehicle wheel, comprising a felly presenting two outwardly and laterally inclined surfaces, a detachable rim, locking rings having beveled inner edges adapted for insertion between said rim and said inclined surfaces of the felly, and radially movable members having beveled surfaces adapted to engage with said locking rings for forcing the latter into position.

8. In a vehicle wheel, the combination of a detachable rim formed of two oppositely disposed clamping rings, locking keys for holding said rings against lateral displacement in respect to each other, a tire carried by said rim, and outwardly extending flanges carried by said keys and extending into engagement with said tire for holding said keys in position upon the inflation of the tire.

In testimony whereof I have signed my name to this specification in the presence of two subscribing witnesses.

ISAIAH C. SCUDDER.

Witnesses:
   JNO. M. RITTER,
   CLAIR W. FAIRBANK.